(12) United States Patent
Noh (10) Patent No.: US 10,771,846 B2
(45) Date of Patent: Sep. 8, 2020

(54) ELECTRONIC APPARATUS FOR PLAYING SUBSTITUTIONAL ADVERTISEMENT AND METHOD FOR CONTROLLING METHOD THEREOF

(71) Applicant: SAMSUNG ELECTRONICS CO., LTD., Suwon-si, Gyeonggi-do (KR)

(72) Inventor: Ki Tae Noh, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/896,510

(22) Filed: Feb. 14, 2018

(65) Prior Publication Data

US 2018/0234729 A1    Aug. 16, 2018

(30) Foreign Application Priority Data

Feb. 15, 2017 (KR) .......................... 10-2017-0020589

(51) Int. Cl.
*H04N 21/234* (2011.01)
*H04N 21/458* (2011.01)
(Continued)

(52) U.S. Cl.
CPC ... *H04N 21/4586* (2013.01); *H04N 21/23424* (2013.01); *H04N 21/26216* (2013.01);
(Continued)

(58) Field of Classification Search
CPC ....... H04N 21/23424; H04N 21/44016; H04N 21/4586; H04N 21/4331; H04N 21/26216; H04N 21/4622
See application file for complete search history.

(56) References Cited

U.S. PATENT DOCUMENTS 6,993,245 B1 * 1/2006 Harville .................. H04N 5/76
348/E7.061
9,386,329 B2    7/2016 Koyama et al.
(Continued)

FOREIGN PATENT DOCUMENTS

EP           1 657 918 A1     5/2006
KR    10-2013-0109676         10/2013
(Continued)

OTHER PUBLICATIONS

International Search Report, PCT/ISA/210, dated Jun. 5, 2018, in corresponding International Patent Application No. PCT/KR/2018/001954.

(Continued)

*Primary Examiner* — Junior O Mendoza
(74) *Attorney, Agent, or Firm* — Staas & Halsey LLP (57) ABSTRACT

A display apparatus includes a communication interface configured to receive a broadcasting image from a broadcasting transmission apparatus; a display configured to display the broadcasting image; a memory configured to store an application for displaying a substitutional advertisement image on the display instead of the broadcasting image; and a processor configured to: determine whether a state of the display apparatus satisfies a specified condition for displaying the substitutional advertisement image on the display; and if the state of the display apparatus satisfies the specified condition, execute the application to thereby cause the substitutional advertisement image to be displayed on the display instead of the broadcasting image.

12 Claims, 4 Drawing Sheets

(51) Int. Cl.
 *H04N 21/262* (2011.01)
 *H04N 21/44* (2011.01)
 *H04N 21/433* (2011.01)
 *H04N 21/462* (2011.01)
 *H04N 21/81* (2011.01)

(52) U.S. Cl.
 CPC ... *H04N 21/4331* (2013.01); *H04N 21/44016* (2013.01); *H04N 21/4622* (2013.01); *H04N 21/812* (2013.01)

(56) References Cited

U.S. PATENT DOCUMENTS

| | | | |
|---|---|---|---|
| 9,710,239 B2 | 7/2017 | Sripathan et al. | |
| 2002/0083435 A1* | 6/2002 | Blasko | G06Q 30/02 725/14 |
| 2006/0101488 A1 | 5/2006 | Cho | |
| 2008/0024678 A1* | 1/2008 | Kim | H04N 5/445 348/725 |
| 2009/0029721 A1* | 1/2009 | Doraswamy | G06Q 30/02 455/456.3 |
| 2009/0043659 A1 | 2/2009 | Lee | |
| 2010/0174607 A1* | 7/2010 | Henkin | H04L 67/28 705/14.53 |
| 2012/0082266 A1 | 4/2012 | Kitazato et al. | |
| 2012/0110615 A1* | 5/2012 | Kilar | G06Q 30/02 725/32 |
| 2012/0143660 A1* | 6/2012 | Jiwang | G06Q 30/0241 705/14.4 |
| 2013/0205335 A1* | 8/2013 | Sinha | G06T 1/0021 725/32 |
| 2014/0047472 A1* | 2/2014 | Haberman | H04N 21/234309 725/32 |
| 2014/0072029 A1* | 3/2014 | Zhai | H04N 19/172 375/240.02 |
| 2014/0249929 A1 | 9/2014 | Delane | |
| 2014/0298381 A1 | 10/2014 | Koyama et al. | |
| 2014/0337127 A1* | 11/2014 | Morel | H04N 21/812 705/14.49 |
| 2014/0337886 A1* | 11/2014 | Zdepski | H04N 21/23424 725/35 |
| 2015/0281781 A1 | 10/2015 | Kitazato et al. | |
| 2016/0253156 A1 | 9/2016 | Sripathan et al. | |
| 2017/0150192 A1* | 5/2017 | Sellers | H04N 21/23424 |
| 2017/0359604 A1 | 12/2017 | Kim | |
| 2018/0234713 A1* | 8/2018 | Kwon | H04N 21/23424 |

FOREIGN PATENT DOCUMENTS

| | | |
|---|---|---|
| KR | 10-2016-0086088 | 7/2016 |
| WO | WO 01/31622 A1 | 5/2001 |

OTHER PUBLICATIONS

Written Opinion, PCT/ISA/237, dated Jun. 5, 2018, in corresponding International Patent Application No. PCT/KR/2018/001954.
Extended European Search Report dated Jul. 29, 2019 in corresponding European Patent Application No. 18754422.6.

* cited by examiner

ELECTRONIC APPARATUS FOR PLAYING SUBSTITUTIONAL ADVERTISEMENT AND METHOD FOR CONTROLLING METHOD THEREOF

CROSS-REFERENCE TO RELATED APPLICATION(S)

This application is based on and claims priority under 35 U.S.C. § 119 to Korean Patent Application No. 10-2017-0020589, filed on Feb. 15, 2017, in the Korean Intellectual Property Office, the disclosure of which is incorporated by reference herein in its entirety.

BACKGROUND

Field

Description of Related Art

The present disclosure relates to a display apparatus that plays a substitutional advertisement, and a controlling method of the display apparatus.

The above information is presented as background information only to assist with an understanding of the present disclosure. No determination has been made, and no assertion is made, as to whether any of the above might be applicable as prior art with regard to the present disclosure.

With the development of various types of electronic devices as well as the development of a broadcasting technology and an Internet communication technology, a variety of content may be provided to a user. In particular, thanks to the development of a mobile device such as a notebook PC, a smartphone, a tablet PC, or the like, the mobile device may directly provide a user with the variety of content.

As well as providing the same content to a plurality of users unilaterally by using the mobile device, it may be possible to provide the plurality of users with different content by using user information of the mobile device.

SUMMARY

A display apparatus executes an application playing a substitutional advertisement and may substitute a broadcasting image received from a broadcasting station through the executed application with a substitutional advertisement to play the substitutional advertisement. When receiving information about a substitutable broadcasting image, the display apparatus may execute an application for the purpose of preventing limited hardware resources from being wasted. At this time, the case where the substitutional advertisement is not played through the application may occur depending on the state of the display apparatus, thereby wasting the limited hardware resource.

Various embodiments of the present disclosure is to provide a display apparatus that verifies the state of the display apparatus before the execution of an application, thereby preventing limited hardware resources from being wasted, and a controlling method of the display apparatus.

In accordance with an aspect of the present disclosure, a display apparatus comprising: a communication interface configured to receive a broadcasting image from a broadcasting transmission apparatus; a display configured to display the broadcasting image; a memory configured to store an application for displaying a substitutional advertisement image on the display instead of the broadcasting image; and a processor configured to: determine whether a state of the display apparatus satisfies a specified condition for displaying the substitutional advertisement image on the display; and if the state of the display apparatus satisfies the specified condition, execute the application to thereby cause the substitutional advertisement image to be displayed on the display instead of the broadcasting image.

In accordance with an aspect of the present disclosure, a controlling method of a display apparatus, the method comprising: by the display apparatus: storing an application for displaying a substitutional advertisement image on a display of the display apparatus instead of a broadcasting image, determining whether a state of the display apparatus satisfies a specified condition for displaying the substitutional advertisement image on the display; and if the state of the display apparatus satisfies the specified condition, executing the application for displaying the substitutional advertisement image on the display instead of the broadcasting image.

According to an embodiment of the present disclosure, A computer-readable recording medium having recorded thereon a program performing a method, the method comprising: determining whether a state of a display apparatus satisfies a specified condition for displaying a substitutional advertisement image on a display of the display apparatus instead of a broadcasting image; and if the state of the display apparatus satisfies the specified condition, executing an application for displaying the substitutional advertisement image on the display instead of the broadcasting image.

According to an embodiment of the present disclosure, an display apparatus and a controlling method of the display apparatus may determine whether the state of a display apparatus is a state where a substitutional advertisement image is displayed in a display, based on the presence of an operable hardware resource for displaying a substitutional advertisement image and a change state of a broadcasting image displayed in the display, when substituting the broadcasting image received from a broadcasting transmission apparatus (or a broadcasting station) with the substitutional advertisement image to display the substitutional advertisement image in the display, and may execute an application for displaying the substitutional advertisement image in a display, if the display apparatus is capable of displaying the substitutional advertisement image, thereby preventing limited hardware resources from being wasted.

Besides, a variety of effects directly or indirectly understood through this disclosure may be provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Hereinafter, various embodiments of the present disclosure will be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar elements may be marked by similar reference numerals.

Figure 1:
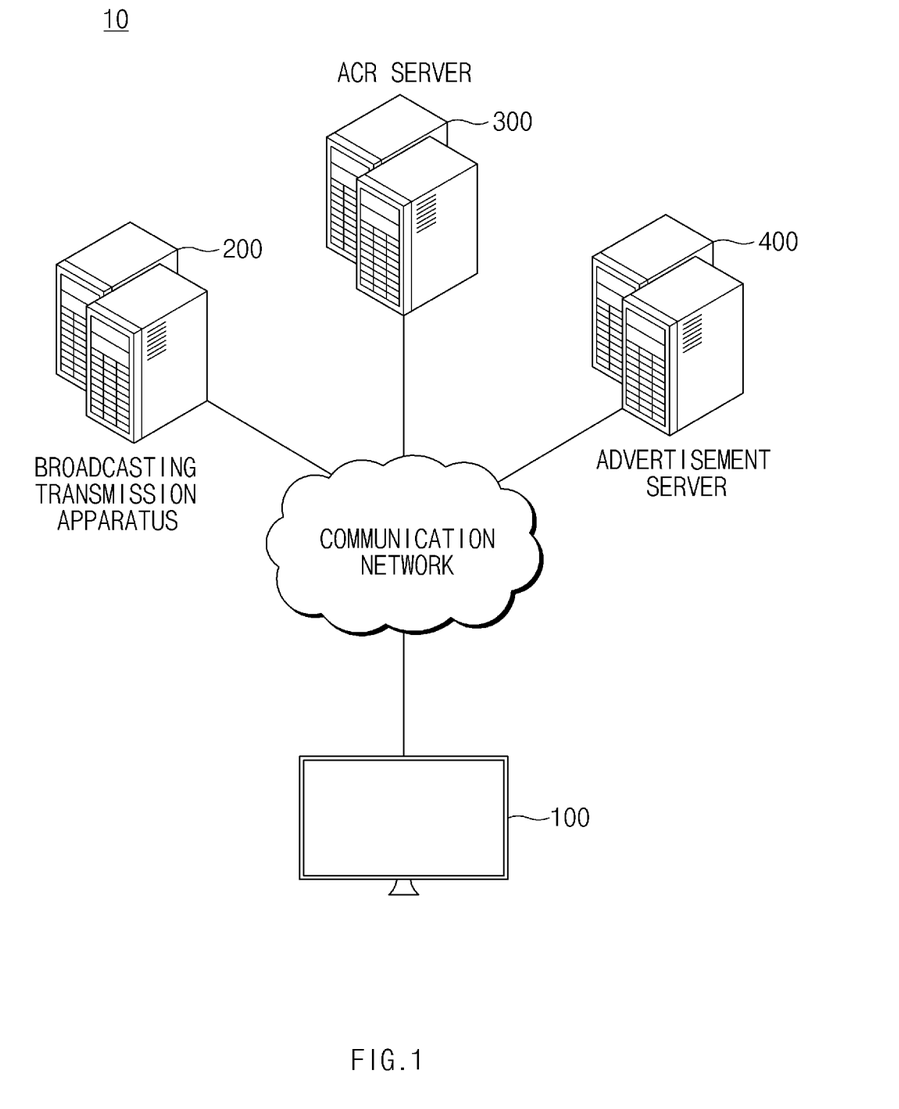
FIG. 1 is a view illustrating a substitutional advertisement providing system, according to various embodiments of the present disclosure.

FIG. 1 is a view illustrating a substitutional advertisement providing system, according to various embodiments of the present disclosure.

Referring to FIG. 1, a substitutional advertisement system 10 may include a display apparatus 100, a broadcasting transmission apparatus (or a broadcasting station) 200, an automatic content recognition (ACR) server 300, and an advertisement server 400. The display apparatus 100 may play the content and the advertisement, which are received from the broadcasting transmission apparatus 200. The content and advertisement may include image (e.g., a video image) and audio signals.

The display apparatus 100 may receive a broadcasting image from the broadcasting transmission apparatus 200. For example, the display apparatus 100 may be connected to the broadcasting transmission apparatus 200 through a communication network (e.g., a RF communication network or an IP communication network) so as to receive the broadcasting image. For example, the broadcasting image may include a content image (e.g., a broadcasting program) or an advertisement image. According to an embodiment, the display apparatus 100 may display the broadcasting image on a display.

According to another embodiment, the display apparatus 100 may receive the broadcasting image from a broadcasting reception apparatus (e.g., a set-top box) (not illustrated). For example, the display apparatus 100 may be connected to the broadcasting reception apparatus by wire (e.g., a high definition multimedia interface (HDMI) or the like) or wirelessly (e.g., wireless-fidelity (Wi-Fi) or the like) and may receive the broadcasting image. For example, the broadcasting reception apparatus may be connected to the broadcasting transmission apparatus 200 over a communication network; and the broadcasting reception apparatus may receive the broadcasting image and may transmit the received broadcasting image to the display apparatus 100. A user interface (UI) image generated by the broadcasting reception apparatus may be blended in the broadcasting image received from the broadcasting reception apparatus.

According to an embodiment, the display apparatus 100 may receive information of a channel corresponding to an image displayed on a display, from the ACR server 300. For example, the display apparatus 100 may be connected to the ACR server 300 through a communication network (e.g., an IP communication network) to receive the channel information. The display apparatus 100 may transmit image identification information generated based on the image displayed on the display, to the ACR server 300 and may receive channel information corresponding to the image identification information.

According to an embodiment, the display apparatus 100 may receive a substitutional advertisement image from the advertisement server 400. For example, the display apparatus 100 may be connected to the advertisement server 400 through the communication network (e.g., the IP communication network) to receive the substitutional advertisement image. The display apparatus 100 may receive the substitutional advertisement image, which will substitute an advertisement image of a broadcasting image received from the broadcasting transmission apparatus 200, based on the channel information received from the ACR server 300. According to an embodiment, the display apparatus 100 may substitute the broadcasting image received from the broadcasting transmission apparatus 200 to display the substitutional advertisement image on a display. For example, the substitutional advertisement image may be displayed on the display by substituting an advertisement image included in the broadcasting image received from the broadcasting transmission apparatus 200.

According to an embodiment, the display apparatus 100 may be implemented with various apparatuses, which are able to receive content from an external device and to display the content, such as a TV, a desktop, a notebook PC, a smartphone, a tablet PC, a monitor, an electronic frame, and the like.

The broadcasting transmission apparatus 200 may transmit the broadcasting image to the display apparatus 100. For example, the broadcasting transmission apparatus 200 may transmit the broadcasting image corresponding to a channel selected by the display apparatus 100, to the display apparatus 100. For example, the broadcasting image may include a content image (e.g., a broadcasting program) and an advertisement image.

The ACR server 300 may verify a channel corresponding to the broadcasting image displayed in the display apparatus 100. For example, the ACR server 300 may verify a channel corresponding to the image displayed in the display apparatus 100, based on image identification information received from the display apparatus 100. According to an embodiment, the ACR server 300 may transmit information about the verified channel (or channel information) to the display apparatus 100.

The advertisement server 400 may transmit a substitutional advertisement to the display apparatus 100. For example, the advertisement server 400 may receive a request for the substitutional advertisement, from the display apparatus 100 and may transmit the substitutional advertisement image to the display apparatus 100 depending on the request.

The display apparatus 100 may substitute the broadcasting image received from the broadcasting transmission apparatus 200 with the substitutional advertisement image received from the advertisement server 400 to display the substitutional advertisement image on a display. The display apparatus 100 may execute an application for displaying the substitutional advertisement image in a display. If verifying a substitutable advertisement among advertisement images of the broadcasting image received from the broadcasting transmission apparatus 200, the display apparatus 100 may execute an application for the purpose of preventing the wasting of hardware resources. At this time, the case where the substitutional advertisement is not displayed depending on the state of the display apparatus 100 may occur. As such, even though the display apparatus 100 fails to display the substitutional advertisement image on a display, the display apparatus 100 may execute the application, thereby wasting hardware resources. The display apparatus 100 according to various embodiments of the present disclosure may verify the state of the display apparatus 100 before executing the application, thereby preventing the limited hardware resources from being wasted.

Figure 2:
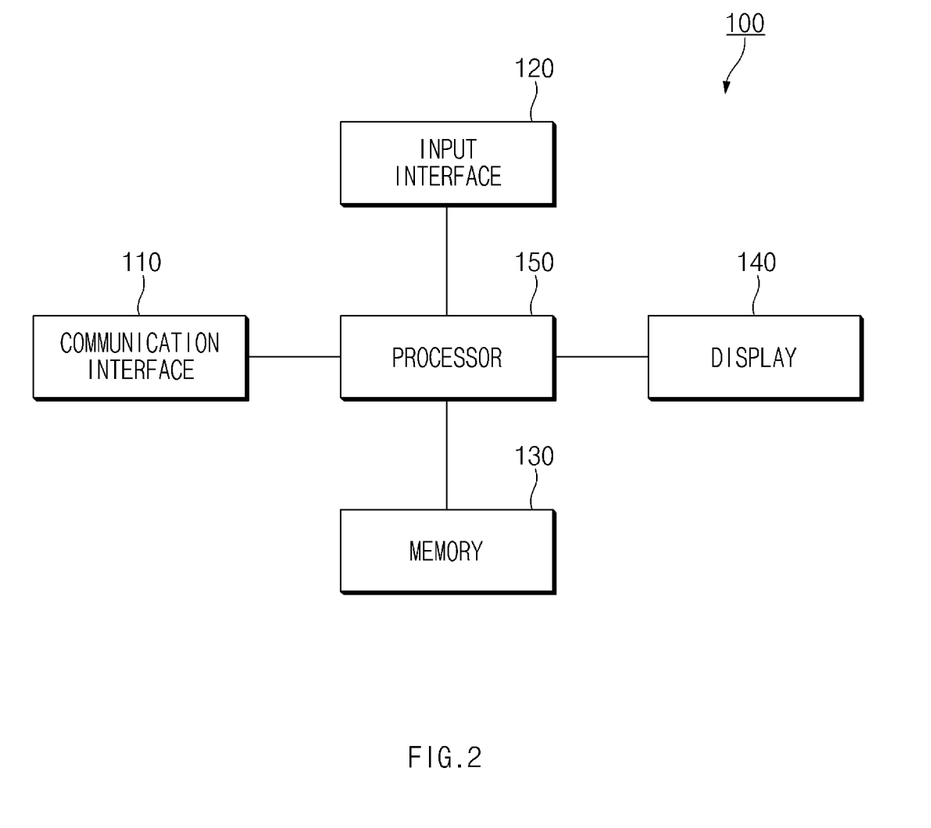
FIG. 2 is a block diagram illustrating a configuration of a display apparatus, according to an embodiment of the present disclosure.

FIG. 2 is a block diagram illustrating a configuration of a display apparatus, according to an embodiment of the present disclosure.

Referring to FIG. 2, the display apparatus 100 may include a communication interface 110, an input interface 120, a memory 130, a display 140, and a processor 150.

The communication interface 110 may be connected to an external device so as to transmit and receive data to and from the external device. For example, the communication interface 110 may be connected to the broadcasting transmission apparatus 200 so as to receive a broadcasting image from the broadcasting transmission apparatus 200. The communication interface 110 may be connected to the ACR server 300 so as to transmit image identification information to the ACR server 300 and so as to receive channel information corresponding to the image identification information from the ACR server 300. The communication interface 110 may be connected to the advertisement server 400 so as to transmit a substitutional advertisement request to the advertisement server 400 and so as to receive a substitutional advertisement according to the request from the advertisement server 400.

According to an embodiment, the input interface 120 may receive a user input. For example, the input interface 120 may be a user input for changing a broadcasting image displayed on the display 140. For example, the user input may be a user input for changing the scale of the broadcasting image. For another example, the user input may be a user input for displaying additional information received together with the broadcasting image, on the display 140.

According to an embodiment, the memory 130 may store an application that displays a substitutional advertisement on the display 140. For example, the memory 130 may store an application that substitutes an advertisement image received from the broadcasting transmission apparatus 200 with the substitutional advertisement image received from the advertisement server 400 to display the substitutional advertisement image on the display 140.

The display 140 may display an image received from an external apparatus. For example, the display 140 may display the broadcasting image (e.g., a content image or an advertisement image) received from the broadcasting transmission apparatus 200. The display 140 may substitute the advertisement image received from the broadcasting transmission apparatus 200 with the substitutional advertisement image received from the advertisement server 400 to display the substitutional advertisement image.

The processor 150 may control overall operations of the display apparatus 100. For example, the processor 150 may control the communication interface 110, the input interface 120, the memory 130, and the display 140 to display the image received from the broadcasting transmission apparatus 200 on the display 140. When displaying the substitutional advertisement image on the display 140, the processor 150 may determine whether the display apparatus 100 is capable of displaying the substitutional advertisement image; if the display apparatus 100 is capable of displaying the substitutional advertisement image, the processor 150 may display the substitutional advertisement image on the display 140. An operation in which the processor 150 determines the state of the display apparatus 100 to display the substitutional advertisement image on the display 140 will be described with reference to FIGS. 3 and 4.

Figure 3:
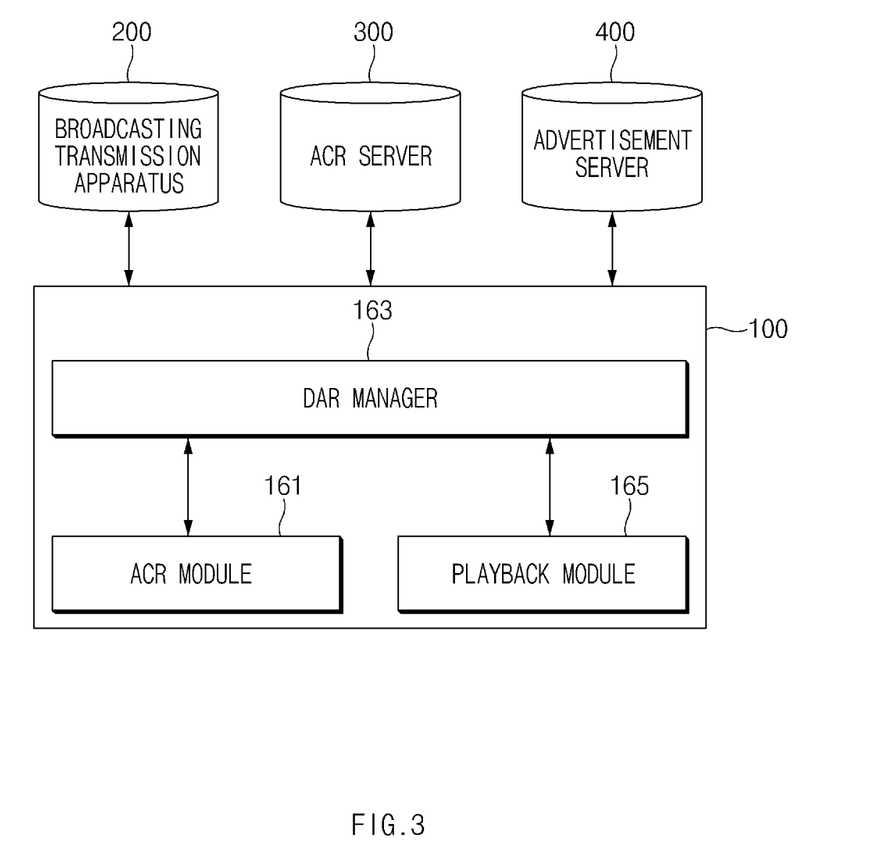
FIG. 3 is a view illustrating a program module included on a display apparatus, according to an embodiment of the present disclosure.

FIG. 3 is a view illustrating a program module included on a display apparatus, according to an embodiment of the present disclosure.

Referring to FIG. 3, a program module (e.g., middleware or an application) included in the display apparatus 100 may include an ACR module 161, a DAR manager 163, and a playback module 165. The program modules may be stored in the memory 130. After being executed by a processor 150, the program modules may perform operations.

The ACR module 161 may generate image identification information based on an image displayed on the display 140. For example, the ACR module 161 may be an application capable of generating the identification information of an image. The ACR module 161 may capture the image displayed on the display 140 and may generate image identification information (fingerprint information or watermark information) by using the captured image. For example, the ACR module 161 may reduce the captured image and may extract minutiae representing the captured image to generate fingerprint information. For another example, the ACR module 161 may extract a unique watermark inserted into the captured image, to generate watermark information. According to an embodiment, the ACR module 161 may transmit the image identification information to the ACR server 300.

According to an embodiment, the ACR server 300 may receive the image identification information to verify a channel corresponding to the image identification information. For example, the ACR server 300 may include a database that stores the image identification information corresponding to each broadcasting channel. The ACR server 300 may compare the image identification information received from the ACR module 161 with image identification information for each broadcasting channel, which is stored in the database, to verify a channel (or channel information) corresponding to the image identification information.

According to an embodiment, the ACR server 300 may verify a broadcasting schedule (e.g., a broadcasting program schedule or an advertisement schedule) of the channel corresponding to the verified channel information. For example, the ACR server 300 may determine whether a substitutable advertisement is included in the channel corresponding to the channel information, by using broadcasting schedules of a plurality of channels stored in the database. If the substitutable advertisement is included in the channel corresponding to the channel information, the ACR server 300 may verify information (e.g., the start time of an advertisement, identification information of an advertisement, or the like) about the substitutable advertisement. The ACR server 300 may transmit, to the display apparatus 100, the channel information and the information about the substitutable advertisement of the channel corresponding to the channel information. According to an embodiment, at least part of operations performed by the ACR server 300 may be performed by the ACR module 161.

According to an embodiment, if the information about the substitutable advertisement is received from the ACR server 300, the DAR manager 163 may execute the playback module 165. For example, the DAR manager 163 may be middleware capable of executing the playback module 165. If the information about the substitutable advertisement is received from the ACR server 300, the DAR manager 163 may execute the playback module 165 for the purpose of displaying the substitutional advertisement received from the advertisement server 400 on the display 140.

According to an embodiment, before executing the playback module 165, the DAR manager 163 may determine whether the state of the display apparatus 100 satisfies a specified condition for displaying the substitutional advertisement image. In other words, when receiving the information about the substitutable advertisement, the DAR manager 163 may determine whether the state of the display apparatus 100 satisfies the specified condition for displaying the substitutional advertisement image. For example, for the purpose of determining whether the specified condition is satisfied, the DAR manager 163 may determine whether an operable hardware resource for displaying the substitutional advertisement image is present and the broadcasting image is not changed depending on the user input.

According to an embodiment, the DAR manager 163 may determine whether the operable hardware resource for displaying the substitutional advertisement image is present. For example, the DAR manager 163 may determine whether the operable scaler for processing the substitutional advertisement image is present. In other words, for the purpose of processing the substitutional advertisement image, the DAR manager 163 may determine whether the operable hardware resource for displaying the substitutional advertisement image is present, by determining whether the operable scaler is present. The DAR manager 163 may determine whether the scaler is capable of processing the substitutional advertisement image to determine whether the scaler corresponds to the operable scaler for processing the substitutional advertisement image. According to an embodiment, the DAR manager 163 may include a plurality of scalers. For example, the plurality of scalers may include a main scaler and a sub scaler. The main scaler may be a scaler for displaying the broadcasting image on the display 140, and the sub scaler may be a scaler for displaying an image (e.g., a substitutional advertisement image or an additional information image) other than the broadcasting image on the display 140. As such, the DAR manager 163 may determine whether the sub scaler is capable of processing the substitutional advertisement image on the display 140, to determine whether the sub scaler corresponds to the operable scaler for processing the substitutional advertisement image.

According to an embodiment, the DAR manager 163 may determine whether the broadcasting image received from the broadcasting transmission apparatus 200 is not changed by a user input. For example, the DAR manager 163 may determine whether the scale (e.g., an image rate, an image size, or the like) of the broadcasting image, which is received from the broadcasting transmission apparatus 200 and which is displayed on the display 140, is not changed depending on the user input. If determining that the scale of the broadcasting image displayed on the display 140 is not changed depending on the user input, the DAR manager 163 may determine whether the broadcasting image is not changed. For another example, the DAR manager 163 may determine whether an image included in additional information (e.g., subtitle information) capable of being received from the broadcasting transmission apparatus 200 together with the broadcasting image is not displayed in the display 140 together with the broadcasting image depending on the user input. If determining that the image included in the additional information is not displayed on the display 140 together with the broadcasting image depending on the user input, the DAR manager 163 may determine whether the broadcasting image is not changed. For example, the additional information may be information corresponding to the broadcasting image, and the image included in the additional information may be displayed in the display 140 together with the broadcasting image depending on the selection of a user. For another example, the DAR manager 163 may determine whether a channel in which the broadcasting image is received from the broadcasting transmission apparatus 200 is not changed depending on the user input. If determining that the channel is not changed depending on the user input, the DAR manager 163 may determine that the broadcasting image is not changed. For example, in the case where the channel is changed by the user input, the DAR manager 163 may determine whether information about the changed channel is not received (or a channel unknown state).

According to another embodiment, in the case where the display apparatus 100 receives the broadcasting image from a broadcasting reception apparatus (not illustrated), the DAR manager 163 may determine whether the received broadcasting image is not changed by the user input. For example, the DAR manager 163 may determine whether an UI image generated by the broadcasting reception apparatus is not blended by the user input in the image received from the broadcasting reception apparatus. For example, the DAR manager 163 may analyze the broadcasting image received from the broadcasting reception apparatus to determine whether the UI image is blended.

According to an embodiment, if an operable hardware resource for displaying the substitutional advertisement image is present and the broadcasting image is not changed depending on the user input, the DAR manager 163 may determine that a specified condition is satisfied. As such, if the state of the display apparatus 100 satisfies the specified condition, the DAR manager 163 may execute the playback module 165.

According to another embodiment, if the operable hardware resource for displaying the substitutional advertisement image is not present and the broadcasting image is changed depending on the user input, the DAR manager 163 may determine that the specified condition is not satisfied. According to an embodiment, if the state of the display apparatus 100 does not satisfy the specified condition, the DAR manager 163 may verify the hardware resource and the state of the broadcasting image at a specified period. If the hardware resource and the state of the broadcasting image are changed, the DAR manager 163 may determine (or recheck) whether the state of the display apparatus 100 satisfies the specified condition for displaying the substitutional advertisement image. According to an embodiment, if the state of the display apparatus 100 satisfies the specified condition, the DAR manager 163 may execute the playback module 165.

According to an embodiment, if being executed, the playback module 165 may transmit a substitutional advertisement request to the advertisement server 400. The substitutional advertisement request may include information necessary for the advertisement server 400 to select the substitutional advertisement. For example, the substitutional advertisement request may include the information about the substitutable advertisement and user profile information (e.g., residence area, gender, age, interest, or the like).

According to an embodiment, the advertisement server 400 may transmit the substitutional advertisement (or a substitutional advertisement image) to the display apparatus 100 in response to the request of the playback module 165. According to an embodiment, the advertisement server 400 may select the substitutional advertisement based on at least one of the information about the substitutable advertisement and the user profile information, which are included in the substitutional advertisement request, and may transmit the selected substitutional advertisement to the display apparatus 100. For example, the advertisement server 400 may transmit the time when the substitutable advertisement is displayed on the display 140 or the substitutional advertisement corresponding to a type of the substitutable advertisement to transmit the time or the substitutional advertisement in the display apparatus 100. In addition, the advertisement server 400 may select the substitutional advertisement corresponding to the user profile information to transmit the substitutional advertisement to the display apparatus 100.

According to an embodiment, the playback module 165 may display the substitutional advertisement image received from the advertisement server 400 on the display 140. For example, the playback module 165 may receive the substitutional advertisement corresponding to the substitutional advertisement request transmitted to the advertisement server 400, from the advertisement server 400. The playback module 165 may display the substitutional advertisement image on the display 140 depending on information (e.g., the start time of an advertisement, identification information of an advertisement, or the like) about the substitutable advertisement verified through the ACR server 300.

According to an embodiment, the playback module 165 may play and output the substitutional advertisement received from the advertisement server 400. According to an embodiment, the playback module 165 may display the substitutional advertisement image on the display 140. For example, the playback module 165 may substitute the advertisement image received from the broadcasting transmission apparatus 200, with the substitutional advertisement image to display the substitutional advertisement image on the display 140. According to an embodiment, the playback module 165 may output an audio signal included in the substitutional advertisement through a speaker (not illustrated) in synchronization with the substitutional advertisement image.

According to an embodiment of the present disclosure described with reference to FIGS. 1 to 3, when substituting a broadcasting image received from the broadcasting transmission apparatus 200 with a substitutional advertisement image to display the substitutional advertisement image on the display 140, the display apparatus 100 may verify the presence of an operable hardware resource for displaying the substitutional advertisement image and the change state of a broadcasting image displayed on the display 140 to determine whether the state of the display apparatus 100 is a state where the substitutional advertisement image is capable of being displayed on the display 140 and may execute an application for displaying the substitutional advertisement image on the display 140, thereby preventing limited hardware resources from being wasted.

Figure 4:
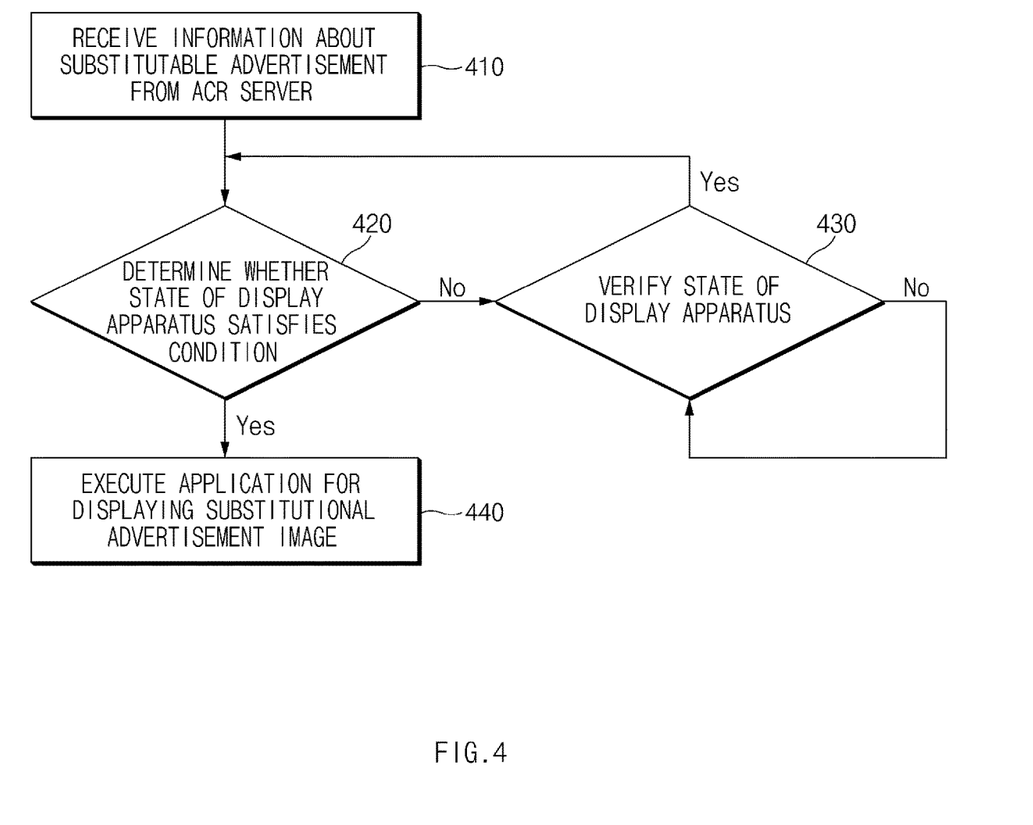
FIG. 4 is a flowchart illustrating a substitutional advertisement playing method of a display apparatus, according to an embodiment of the present disclosure.

FIG. 4 is a flowchart illustrating a substitutional advertisement playing method of a display apparatus, according to an embodiment of the present disclosure.

Referring to FIG. 4, the display apparatus 100 may verify the state of the display apparatus 100 and may execute an application for displaying a substitutional advertisement image on the display 140 when the display apparatus 100 is capable of displaying the substitutional advertisement image on the display 140.

According to an embodiment, in operation 410, the display apparatus 100 may receive information about a substitutable advertisement from the ACR server 300. For example, the display apparatus 100 may verify channel information corresponding to a broadcasting image, which is being displayed in the display apparatus 100, through the ACR server 300 and may verify a broadcasting schedule corresponding to the verified channel information to verify information about the substitutable advertisement of the channel. The ACR server 300 may transmit the information about the substitutable advertisement to the display apparatus 100.

According to an embodiment, in operation 420, the display apparatus 100 may determine whether the state of the display apparatus 100 satisfies a specified condition for displaying the substitutional advertisement image on the display 140. For example, the display apparatus 100 may determine whether an operable hardware resource for displaying the substitutional advertisement image is present and the broadcasting image is not changed depending on a user input. For example, if the operable hardware resource for displaying the substitutional advertisement image is present and the broadcasting image is not changed depending on the user input, the display apparatus 100 may determine that the specified condition is satisfied.

According to an embodiment, if the state of the display apparatus 100 satisfies the specified condition (Yes), in operation 440, the display apparatus 100 may execute an application for displaying the substitutional advertisement image on the display 140. The display apparatus 100 may execute the application and may substitute the broadcasting image received from the broadcasting transmission apparatus 200 with the substitutional advertisement image to display the substitutional advertisement image.

According to an embodiment, if the state of the display apparatus 100 does not satisfy the specified condition (No), in operation 430, the display apparatus 100 may verify the state of the display apparatus 100 at a specified period. For example, the display apparatus 100 may verify hardware resources and the state of the broadcasting image at a specified period. According to an embodiment, if the state of the display apparatus 100 is changed (No), display apparatus 100 may reverify the state of the display apparatus 100. For example, the display apparatus 100 may reverify the state of the display apparatus 100 after a specified time. According to an embodiment, if the state of the display apparatus 100 is changed (Yes), the display apparatus 100 may determine whether the state of the display apparatus 100 satisfies the specified condition for displaying the substitutional advertisement image.

According to various embodiments, at least a part of an apparatus e.g., modules or functions thereof or a method e.g., operations may be, for example, implemented by instructions stored in a computer-readable storage media in the form of a program module. The instruction, when executed by a processor, may cause the processor to perform a function corresponding to the instruction. The computer-readable recording medium may include a hard disk, a floppy disk, a magnetic media e.g., a magnetic tape, an optical media e.g., a compact disc read only memory CD-ROM and a digital versatile disc DVD, a magneto-optical media e.g., a floptical disk, an embedded memory, and the like. The one or more instructions may contain a code made by a compiler or a code executable by an interpreter.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A display apparatus comprising:
a display;
at least one memory storing instructions; and
at least one processor configured to execute the instructions to cause the following to be performed by the display apparatus:
receiving an advertisement image corresponding to a channel from a broadcasting transmission apparatus, and
while the advertisement image is being displayed on the display,
transmitting, to an advertising server, a request for a substitutional advertisement image for the channel,
receiving, from the advertising server, the substitutional advertisement image in response to the transmitted request,
determining whether an operable scaler for displaying the received substitutional advertisement image is present in the display apparatus, and
when the operable scaler is determined to be present, substituting the received substitutional advertisement image for the advertisement image, and displaying the substituted substitutional advertisement image on the display.

2. The display apparatus of claim 1, wherein
the at least one processor is further configured to execute the instructions to cause the following to be performed by the display apparatus:
determining whether a broadcasting image for the channel transmitted from the broadcasting transmission apparatus has changed, and
the substituting substitutes the received substitutional image for the advertisement image when the operable scaler is determined to be present and the broadcasting image is determined to not have changed.

3. The display apparatus of claim 2, wherein the broadcasting image is determined to not have changed when a scale of the broadcasting image has not changed.

4. The display apparatus of claim 2, wherein
the at least one processor is further configured to execute the instructions to cause the following to be performed by the display apparatus:
receiving additional information corresponding to the broadcasting image together with the broadcasting image,
the broadcasting image is determined to not have changed when an additional information image included in the additional information is not displayed on the display together with the broadcasting image, and
the substituting substitutes the received substitutional image for the advertisement image when the operable scaler is determined to be present and the broadcasting image is determined to not have changed.

5. The display apparatus of claim 2, wherein
the broadcasting image is determined to not have changed when the channel has not changed.

6. A method comprising:
by a display apparatus:
receiving an advertisement image corresponding to a channel from a broadcasting transmission apparatus, and
while the advertisement image is being displayed on a display of the display apparatus,
transmitting, to an advertising server, a request for a substitutional advertisement image for the channel,
receiving, from the advertising server, the substitutional advertisement image in response to the transmitted request,
determining whether an operable scaler for displaying the received substitutional advertisement image is present in the display apparatus, and
when the operable scaler is determined to be present, substituting the received substitutional advertisement image for the advertisement image, and displaying the substituted substitutional advertisement image on the display.

7. The method of claim 6, further comprising:
by the display apparatus,
determining whether a broadcasting image for the channel transmitted from the broadcasting transmission apparatus has changed,
wherein the substituting substitutes the received substitutional image for the advertisement image when the operable scaler is determined to be present and the broadcasting content is determined to not have changed.

8. The method of claim 7, wherein the broadcasting image is determined to not have changed when a scale of the broadcasting image has not changed.

9. The method of claim 7, further comprising:
by the display apparatus,
receiving additional information corresponding to the broadcasting image together with the broadcasting image,
wherein the broadcasting image is determined to not have changed when an additional information image included in the additional information is not displayed on the display together with the broadcasting image, and
wherein the substituting substitutes the received substitutional image for the advertisement image when the operable scaler is determined to be present and the broadcasting image is determined to not have changed.

10. The method of claim 7, wherein the broadcasting image is determined to not have changed when the channel is not changed.

11. A non-transitory computer-readable recording medium having recorded thereon a program that, when executed by a display apparatus, causes the display apparatus to perform a method comprising:
receiving an advertisement image corresponding to a channel from a broadcasting transmission apparatus, and
while the advertisement image is being displayed on the display,
transmitting, to an advertising server, a request for a substitutional advertisement image for the channel,
receiving, from the advertising server, the substitutional advertisement image in response to the transmitted request,
determining whether an operable scaler for displaying the received substitutional advertisement image is present in the display apparatus, and
when the operable scaler is determined to be present, substituting the received substitutional advertisement image for the advertisement image, and displaying the substituted substitutional advertisement image on the display.

12. A display apparatus comprising:
a display;
at least one memory storing instructions; and
at least one processor configured to execute the instructions to cause the following to be performed by the display apparatus:
receiving an advertisement image corresponding to a channel from a broadcasting transmission apparatus, and
while content of the channel is being displayed on the display,
transmitting, to an advertising server, a request for a substitutional advertisement image for the channel,
receiving, from the advertising server, the substitutional advertisement image in response to the transmitted request,
determining whether an operable scaler for displaying the received substitutional advertisement image is present in the display apparatus, and
when the operable scaler is determined to be present, substituting the received substitutional advertisement image for the advertisement image, and displaying the substituted substitutional advertisement image on the display.

* * * * *